(12) United States Patent
Wakileh et al.

(10) Patent No.: US 8,369,679 B2
(45) Date of Patent: Feb. 5, 2013

(54) SWITCHED GROUNDING ASSEMBLIES

(75) Inventors: George I. Wakileh, Batavia, IL (US);
Eduardo Leon, Woodridge, IL (US);
Simon Shen-Meng Chen, Palatine, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 714 days.

(21) Appl. No.: 12/554,375

(22) Filed: Sep. 4, 2009

(65) Prior Publication Data

US 2010/0059246 A1   Mar. 11, 2010

Related U.S. Application Data

(63) Continuation-in-part of application No. 12/127,312, filed on May 27, 2008, now Pat. No. 7,603,020.

(51) Int. Cl.
*G02B 6/00* (2006.01)
(52) U.S. Cl. ............................................ 385/147; 174/78
(58) Field of Classification Search .................. 385/147; 174/78; 439/43, 346
See application file for complete search history.

(56) References Cited

U.S. PATENT DOCUMENTS

| | | | | |
|---|---|---|---|---|
| 3,274,355 | A * | 9/1966 | Francy | 200/435 |
| 4,234,936 | A * | 11/1980 | Siegal | 365/244 |
| 4,744,629 | A | 5/1988 | Bertoglio et al. | |
| 4,805,979 | A | 2/1989 | Bossard et al. | |
| 4,961,623 | A | 10/1990 | Midkiff et al. | |
| 5,121,458 | A | 6/1992 | Nilsson et al. | |
| 5,271,080 | A | 12/1993 | Hopper et al. | |
| 5,778,122 | A | 7/1998 | Giebel et al. | |
| 5,790,741 | A | 8/1998 | Vincent et al. | |
| 6,226,434 | B1 | 5/2001 | Koshiyama et al. | |
| 6,466,725 | B2 | 10/2002 | Battey et al. | |
| 6,527,598 | B1 * | 3/2003 | Opel | 439/709 |
| 6,627,815 | B1 * | 9/2003 | Ebersole | 174/53 |
| 6,856,748 | B1 | 2/2005 | Elkins, II et al. | |
| 7,048,586 | B2 * | 5/2006 | Ishizaki et al. | 439/607.44 |
| 7,916,983 | B2 * | 3/2011 | Sanderson et al. | 385/12 |
| 2003/0156798 | A1 * | 8/2003 | Cull | 385/71 |
| 2005/0202689 | A1 * | 9/2005 | Kim et al. | 439/43 |
| 2009/0197461 | A1 * | 8/2009 | Benoit et al. | 439/535 |

* cited by examiner

*Primary Examiner* — Ellen Kim
(74) *Attorney, Agent, or Firm* — Harness, Dickey & Pierce, P.L.C.

(57) ABSTRACT

An assembly including a ground bar for coupling to a ground, a conductive contact for electrically connecting a wire to the ground bar, and a switch for selectively disconnecting the conductive contact from the ground bar to thereby selectively disconnect the wire from the ground bar when the wire is electrically connected to the conductive contact. The assembly may include a plurality of conductive contacts and a plurality of switches for selectively disconnecting an associated conductive contact from the ground bar. A method of using an assembly having a ground bar, a conductive contact, and a switch includes electrically connecting a wire to the conductive contact, and actuating the switch to selectively disconnect the conductive contact from the ground bar to thereby selectively disconnect the wire from the ground bar without electrically disconnecting the wire from the conductive contact.

22 Claims, 15 Drawing Sheets

SWITCHED GROUNDING ASSEMBLIES

CROSS-REFERENCE TO RELATED APPLICATION

This application is a continuation-in-part of U.S. patent application Ser. No. 12/127,312 filed on May 27, 2008, the entire disclosure of which is incorporated herein by reference.

FIELD

The present disclosure relates to assemblies and methods for selectively connecting and/or disconnecting electrical wires to ground for testing, wire locating or other purposes.

BACKGROUND

This section provides background information related to the present disclosure which is not necessarily prior art.

Fiber optic cables are commonly used in the telecommunication industry. A fiber optic cable generally includes a protective outer jacket surrounding a buffer tube. The buffer tube contains a number of optical fibers. The cable often includes one or more flexible strength members that strengthen the cable while still allowing the cable to bend. A fiber optic cable can also include a tracer wire. The tracer wire is a conductive wire generally used for trouble shooting circuits and locating the cable.

When a technician is installing fiber cable drops, numerous devices and steps are commonly utilized to secure, protect and connect the cable and tracer wire as needed. The fiber optic cable is typically brought into an enclosure through a gasket. A portion of the fiber optic cable jacket is stripped and the strength members are attached to a point in the enclosure with various types of clamps, especially clamping washers, to provide strain relief for the cable. The tracer wire is separated from the fiber optic cable and routed to a ground bar of the enclosure. The tracer wire jacket is stripped and the tracer wire is bonded to the ground bar to ground the tracer wire. This is most frequently accomplished by wrapping the tracer wire around a threaded stud on the ground bar. The tracer wire is then held in place by screwing a nut onto the threaded stud.

When a technician needs to perform certain operations, such as toning a tracer wire to locate the cable with which it is associated, the technician must typically physically disconnect the tracer wire from the ground bar. The technician first needs to locate the correct tracer wire. Then, the technician may unscrew a nut holding the tracer wire on a threaded stud before removing the tracer wire. Finally, the technician can connect the test equipment to the tracer wire and perform the necessary tests. Once the tests are complete, the technician must reverse these steps to reconnect the wire to ground.

Various other types of wires (e.g., twisted shielded pair, coaxial cable, etc.) are also used in telecommunications systems, and many of these wires are grounded in a manner similar to that discussed above with respect to a tracer wire. For example, in copper wire networks, the shield of a twisted pair wire (or bundle of wires) is typically grounded four times per mile of wire.

SUMMARY

This section provides a general summary of the disclosure, and is not a comprehensive disclosure of its full scope or all of its features.

According to one aspect of the present disclosure, an assembly includes a ground bar for coupling to a ground, a conductive contact for electrically connecting a wire to the ground bar, and a switch for selectively disconnecting the conductive contact from the ground bar to thereby selectively disconnect the wire from the ground bar when the wire is electrically connected to the conductive contact.

According to another aspect of the present disclosure, a method of using an assembly having a ground bar, a conductive contact, and a switch is provided. The method includes electrically connecting a wire to the conductive contact, and actuating the switch to selectively disconnect the conductive contact from the ground bar to thereby selectively disconnect the wire from the ground bar without electrically disconnecting the wire from the conductive contact.

According to yet another aspect of the present disclosure, an assembly includes a ground bar for coupling to a ground, a plurality of conductive contacts for electrically connecting a plurality of wires to the ground bar, and a plurality of switches each associated with a different one of the conductive contacts for selectively disconnecting its associated conductive contact from the ground bar to thereby selectively disconnect one or more of the plurality of wires from the ground bar when the one or more of the plurality of wires is electrically connected to the switch's associated conductive contact.

Further areas of applicability will become apparent from the description provided herein. The description and specific examples in this summary are intended for purposes of illustration only and are not intended to limit the scope of the present disclosure

DRAWINGS

DETAILED DESCRIPTION

Figure 1:
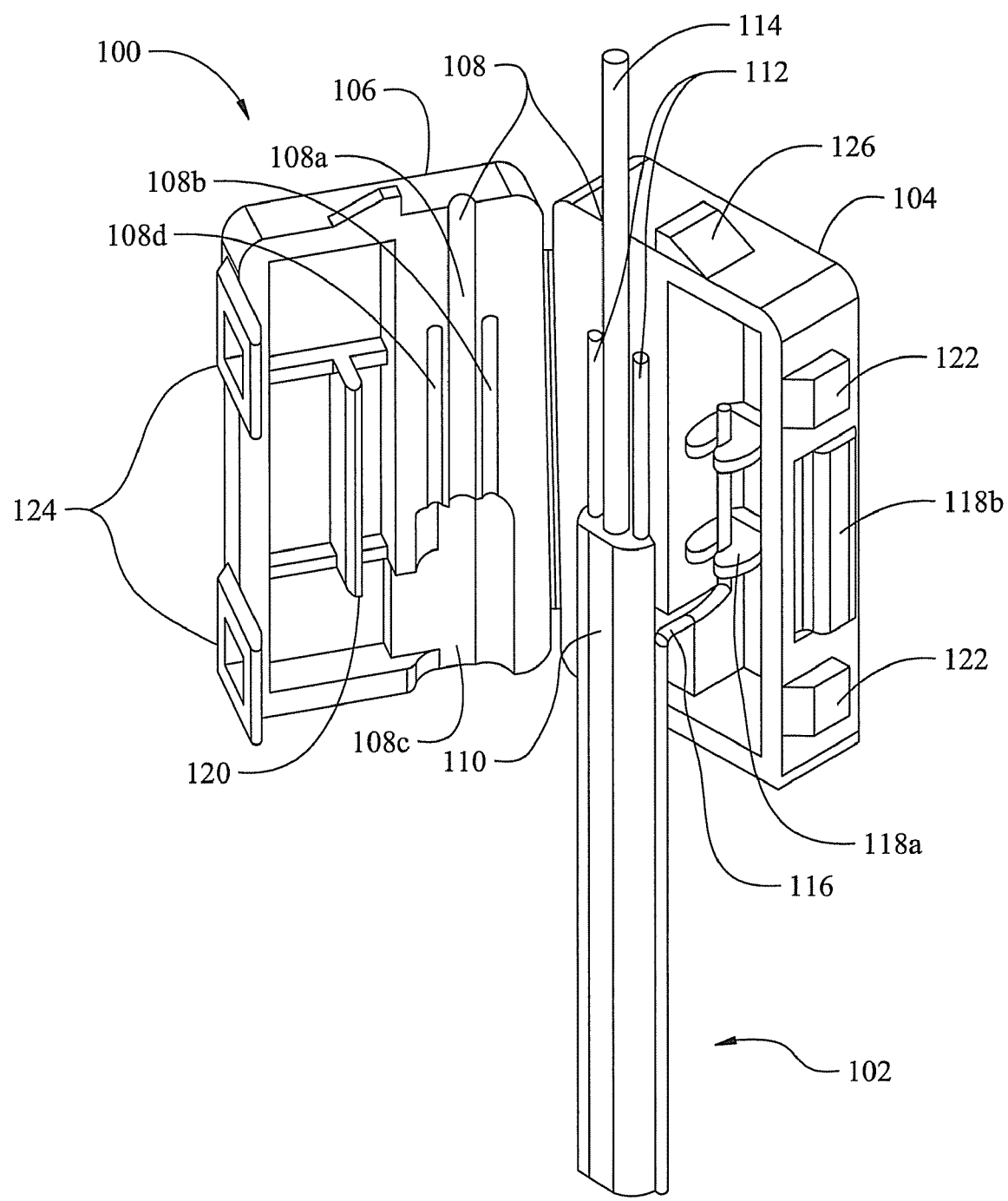
FIG. 1 is a front isometric view of a fiber optic cable clamp module with a fiber optic cable mounted therein.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a fiber optic cable clamp module, generally indicated by reference numeral 100, according to one embodiment of the present disclosure. For illustrative purposes, a fiber optic cable 102 is also illustrated in FIG. 1. The clamp module 100 includes an enclosure 104 having a cover 106. A channel 108 in the enclosure 104 and the cover 102 is designed to receive the fiber optic cable 102. The channel 108 traverses from one end of the enclosure 104 and cover 106 to an opposite end (e.g., from top to bottom in FIG. 1).

As can be seen in FIG. 1, the channel 108 is not a uniform channel, but includes differently shaped portions 108a-d (in the enclosure 104 and the cover 106) for receiving different portions of the fiber optic cable 102. A jacketed portion 110 of the fiber optic cable 102 is received within portion 108c of the channel 108. A portion of the jacket of the fiber optic cable 102 is removed and strength members 112 and a buffer tube 114 are exposed and received within portions 108a-c of the channel 108. Neither the strength members 112 nor the jacketed portion 110 of the fiber optic cable exit the top portion of the enclosure 104. Instead, these portions enter the channel 108 at one end of the enclosure 104 and terminate before exiting the channel 108 at the other end. The buffer tube 114, however, exits the top end of the enclosure 104.

A tracer wire 116 is illustrated attached to the fiber optic cable 102. One end of the tracer wire 116 is separated from the cable 102 and a portion of the insulation covering the tracer wire 116 is removed. The tracer wire 116 is connected to a conductive contact 118 of the enclosure 104. The conductive contact 118 includes a portion 118a inside the enclosure 104 and a portion 118b outside the enclosure 104. The tracer wire 116 is connected to the inside portion 118a of the conductive contact 118 inside the enclosure 104. The internal portion is illustrated as two v-shaped terminals in FIG. 1, however numerous other configurations are possible.

The conductive contact 118 may include an insulation displacement connector (IDC), that pierces the insulation of the tracer wire 116. In such an embodiment, the covering insulation of the tracer wire 116 need not be removed. The external portion 118b of the conductive contact is electrically connected to the internal portion 118a of the conductive contact 118 and, in the embodiment of FIG. 1, are formed from a unitary piece of conductive material. The conductive contact 118 allows an electrical connection to the tracer wire 116 to be made, through the external portion 118b of the conductive contact, while the cover 106 is closed and the tracer wire 116 is terminated to the inside portion 118a within the enclosure 104.

When the cover 106 is in a closed position, the two halves of the channel 108 (one on the enclosure 104 and one on the cover 106) enclose the jacketed portion 110, the strength members 112 and a portion of the buffer tube 114. In this closed position, the enclosure 104 clamps the fiber optic cable 102 and holds it securely in place. In particular, it holds the strength members 112 tightly to provide strain relief for the fiber optic cable 102. The closed position also provides a weather-tight seal around the cable 102 due to the channel 108 being sized to fit the cable closely.

The clamp module 100 also includes a retaining rib 120. The retaining rib 120 is positioned on the cover 106 and aids in retaining the tracer wire 116 in contact with the inside portion 118a of the conductive contact. When the cover 106 closes, the retaining rib 120 applies a biasing force against the tracer wire to hold the tracer wire 116 in contact with the inside portion 118a of the conductive contact 118.

The clamp module 100 also includes a snap-fit closure. The closure has two components, a male member 122 and a mating female member 124. Two such closures are illustrated in FIG. 1, but more or fewer may be used. When the cover 106 is closing, the resilient female member 124 is forced to bend and travel over the male member. The female member 124 then returns approximately to its original unbent position with the male member 122 retained within the opening of the female member 124. To open the cover 106, the female member 124 can be bent upwards over the edge of the male member. Additionally, or alternatively, the clamp module 100 may include a connector (not shown), such as a screw, bolt, etc., for holding the closure in a closed position. If used together with a snap-fit closure, the connector may be engaged after the male member 122 and female member 124 are snapped together.

After a fiber optic cable 102 is mounted in the clamp module 100, the clamp module 100 can be installed in a carrier. One example of a suitable carrier will be discussed in detail below. The clamp module 100 includes a mounting male member 126 on the top of the enclosure 104 for providing a snap-fit installation into the carrier.

Figure 2:
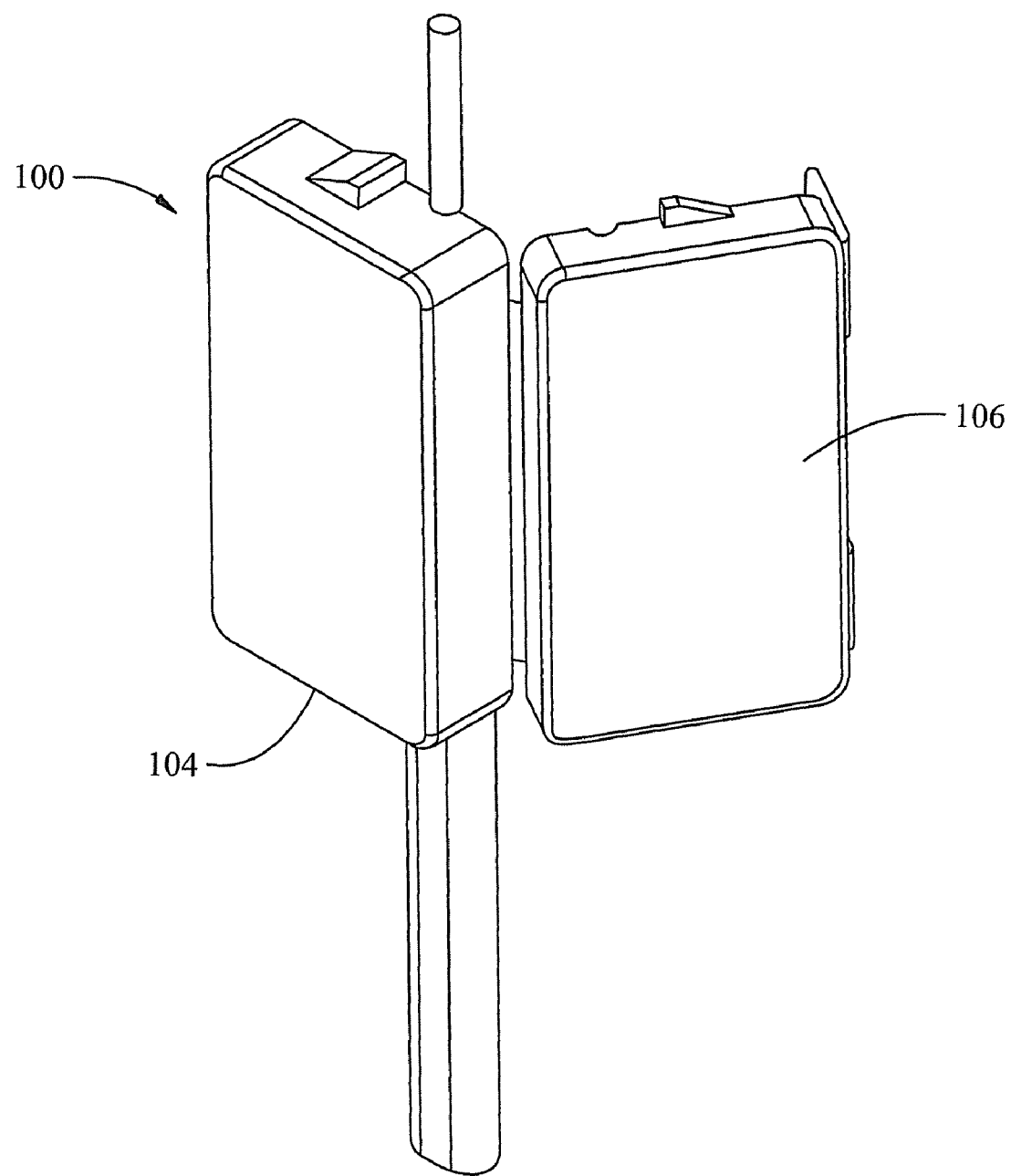
FIG. 2 is a rear isometric view of the fiber optic cable clamp module shown in FIG. 1.

As shown in FIG. 2, the enclosure 104 and the cover 106 are not symmetrical. The cover portion 106 is smaller in depth than the enclosure 104. The extra depth of the enclosure 104 allows room for the conductive contact 118.

Figure 3:
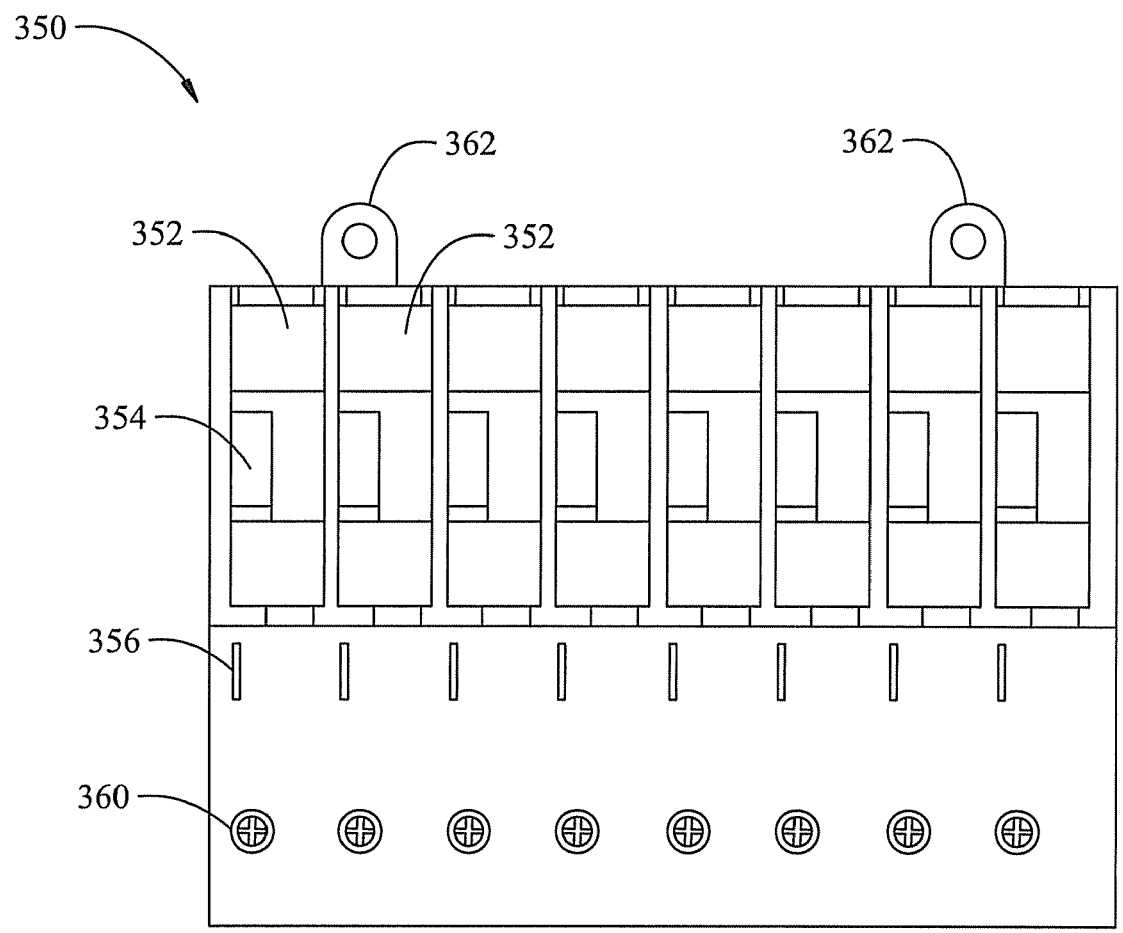
FIG. 3 is a front view of a carrier for the fiber optic cable clamp module of FIG. 1.
Figure 4:
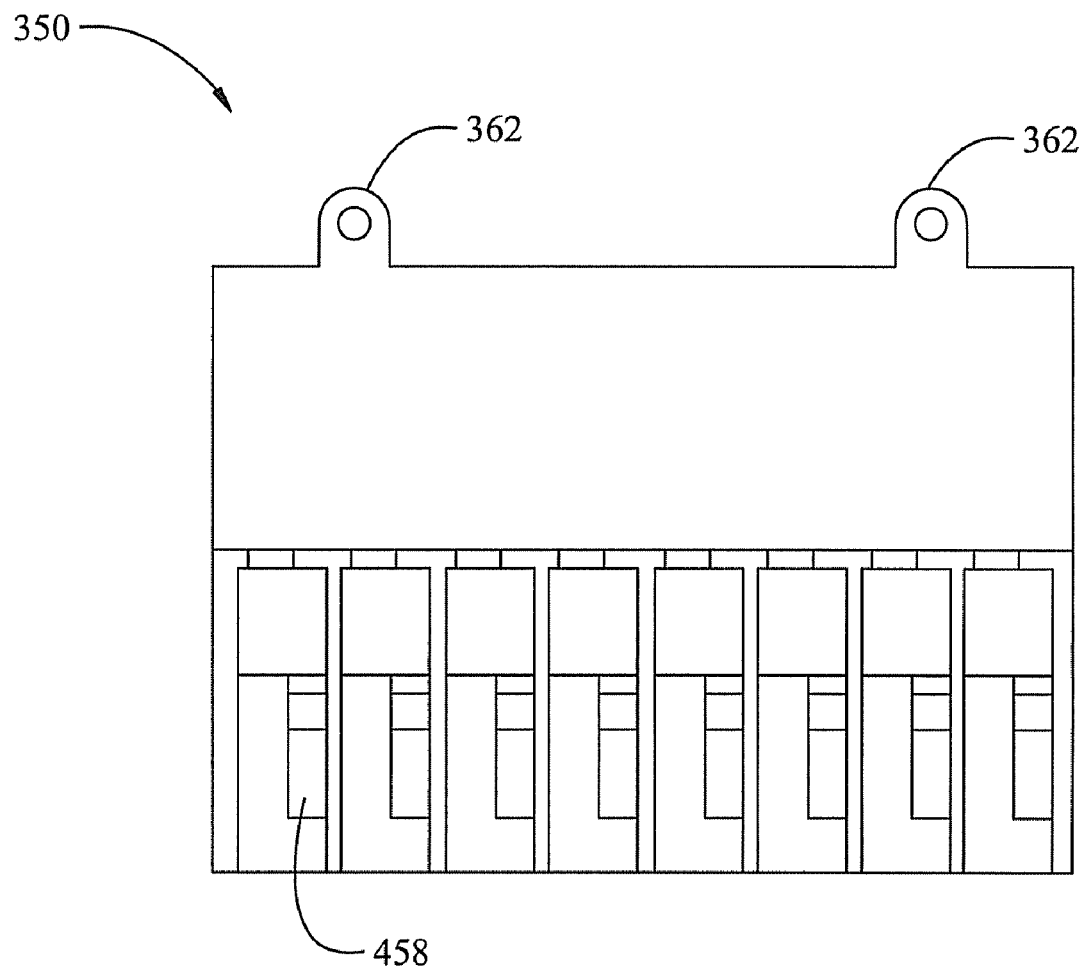
FIG. 4 is a rear view of the carrier of FIG. 3.
Figure 5:
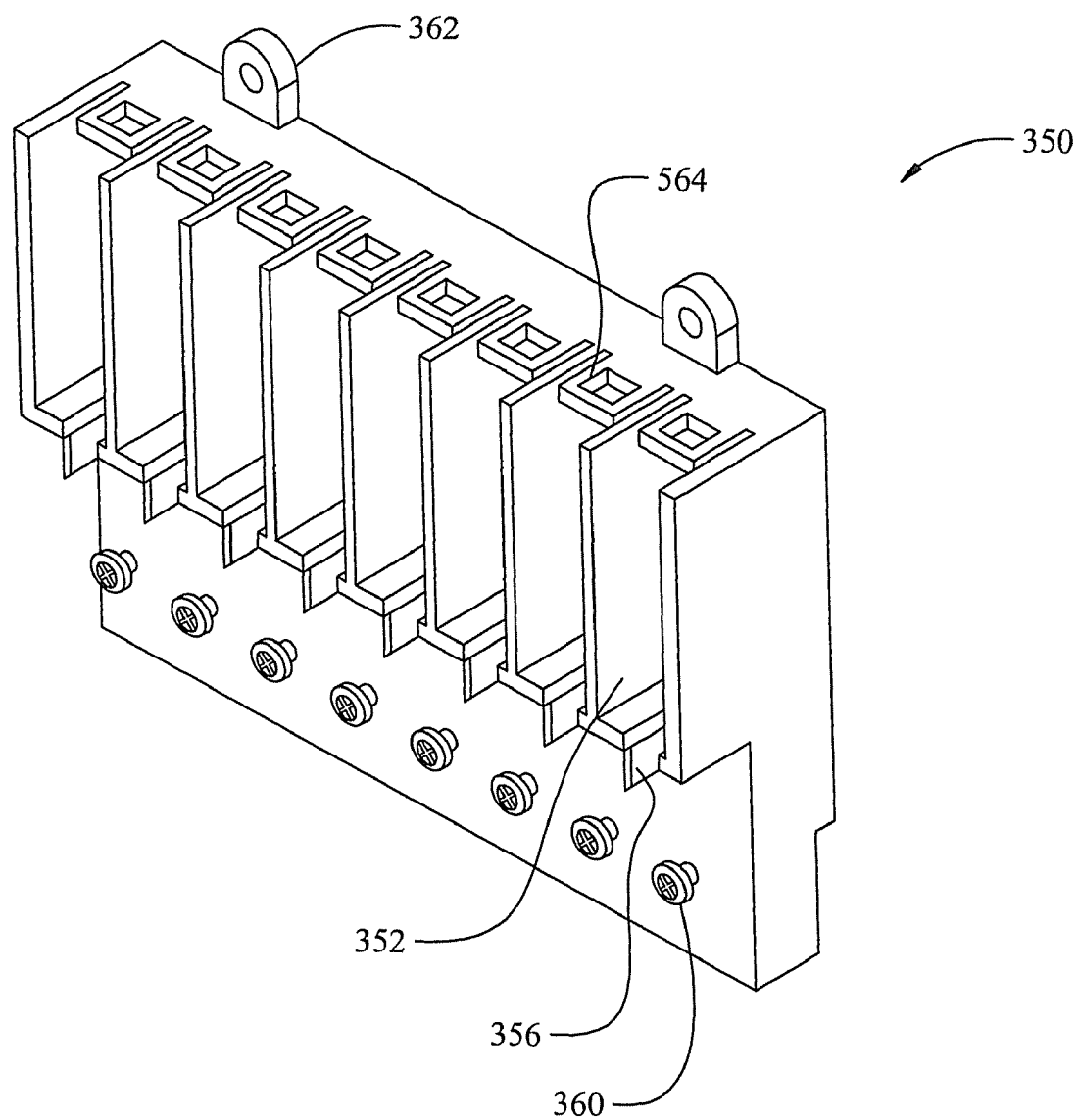
FIG. 5 is a front isometric view of the carrier of FIG. 3.

FIGS. 3-5 illustrate one embodiment of a carrier 350 for a fiber optic cable clamp assembly. The carrier 350 has several bays 352 for receiving cable clamp modules 100. Eight such bays are illustrated, but more or less bays may be included as desired. Each bay 352 in the carrier 350 includes a carrier contact 354. The carrier contact 354 touches the external portion 118*b* of a clamp module's conductive contact 118 when the clamp module 100 is mounted in the carrier. The carrier contact 354 is electrically connected to an associated testing terminal 356 and an associated grounding point 458 (shown in FIG. 4) on the backside of the carrier. The carrier contact 354, testing terminal 356 and grounding point 458 can be made of a single unitary piece of conductive material or separate, but electrically connected, pieces of conductive material. The conductive material can be any conductive material suitable for such purpose including alloys such as beryllium copper and phosphor bronze. A switch 360 (e.g., a screw in the illustrated embodiment) connects and disconnects an associated grounding point 458 to and from a ground bar 668 (shown in FIG. 6). Mounting tabs 362 are included for mounting the carrier 350 to a suitable support structure (e.g., within an outdoor telecommunications equipment enclosure). Numerous other methods of mounting the carrier are, however, also possible.

Figure 6:
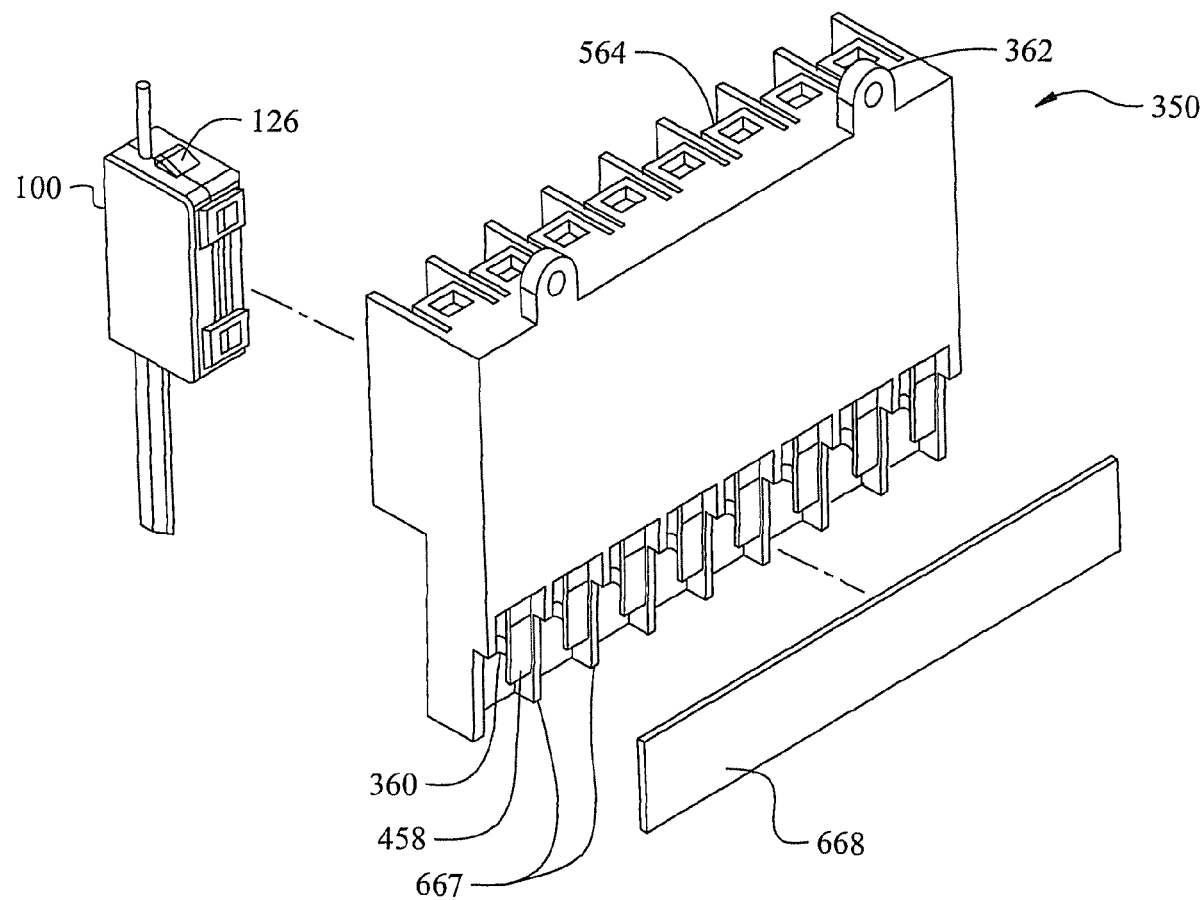
FIG. 6 is a rear isometric exploded view of the cable clamp assembly including a carrier and a clamp module with a fiber optic cable mounted therein.

When the carrier 350 is installed in an enclosure, such as a telecommunications equipment enclosure, it is installed such that each grounding point 458 is adjacent to a ground bar 668, illustrated in FIG. 6. The ground bar 668 rests against insulative dividers 667 positioned between the grounding points 458. The grounding points 458 are initially spaced from and not in contact with the ground bar 668. Each switch 360 allows its associated grounding point 458 to be connected to and disconnected from the ground bar 668. Movement of the switch 360 pushes the grounding point 458 toward the ground bar 668 to connect the grounding point 458 to ground. When the switch 360 connects the grounding point 458 to the ground bar 668, the testing terminal 356 and the carrier contact 354 are grounded. When a clamp module 100 having a fiber optic cable mounted therein is installed in the carrier 350, the tracer wire 116 is grounded through the conductive contact 118, which is electrically connected to the carrier contact 354 via the outside portion 118*b*. An installer or technician can then disconnect the tracer wire 116 from ground in order to perform tests using the tracer wire 116, such as toning the tracer wire 116, by simply actuating the switch 360 to disconnect the associated grounding point 458 from the ground bar 668. Doing so leaves the tracer wires 116 of other cables in other bays 352 of the carrier 350 connected to ground and only disconnects the desired tracer wire 116 from the ground bar 668. Further, the technician can make a connection to the tracer wire 116 through the test terminal 356. The technician is, therefore, able to disconnect the tracer wire 116 from ground and test the tracer wire 116 without removing the tracer wire 116 from the clamp module 100, without removing the clamp module 100 from the carrier, and without even opening the clamp module 100. In the particular example shown in FIG. 3, the testing terminal 356 includes a slot for receiving a test probe.

The carrier includes mounting female members 564 in each bay 352 as illustrated in FIGS. 5 and 6. These mounting female members 564 mate with the mounting male members 126 on the cable modules 100. The male and female members 126, 564 form a snap-fit connection between each module 100 and the carrier 350. The snap-fit connection is formed by sliding the module 100 into a bay until the female member 564 snaps down over the male member 126. This provides a solid, but removable, connection between each module 100 and the carrier 350.

Figure 7:
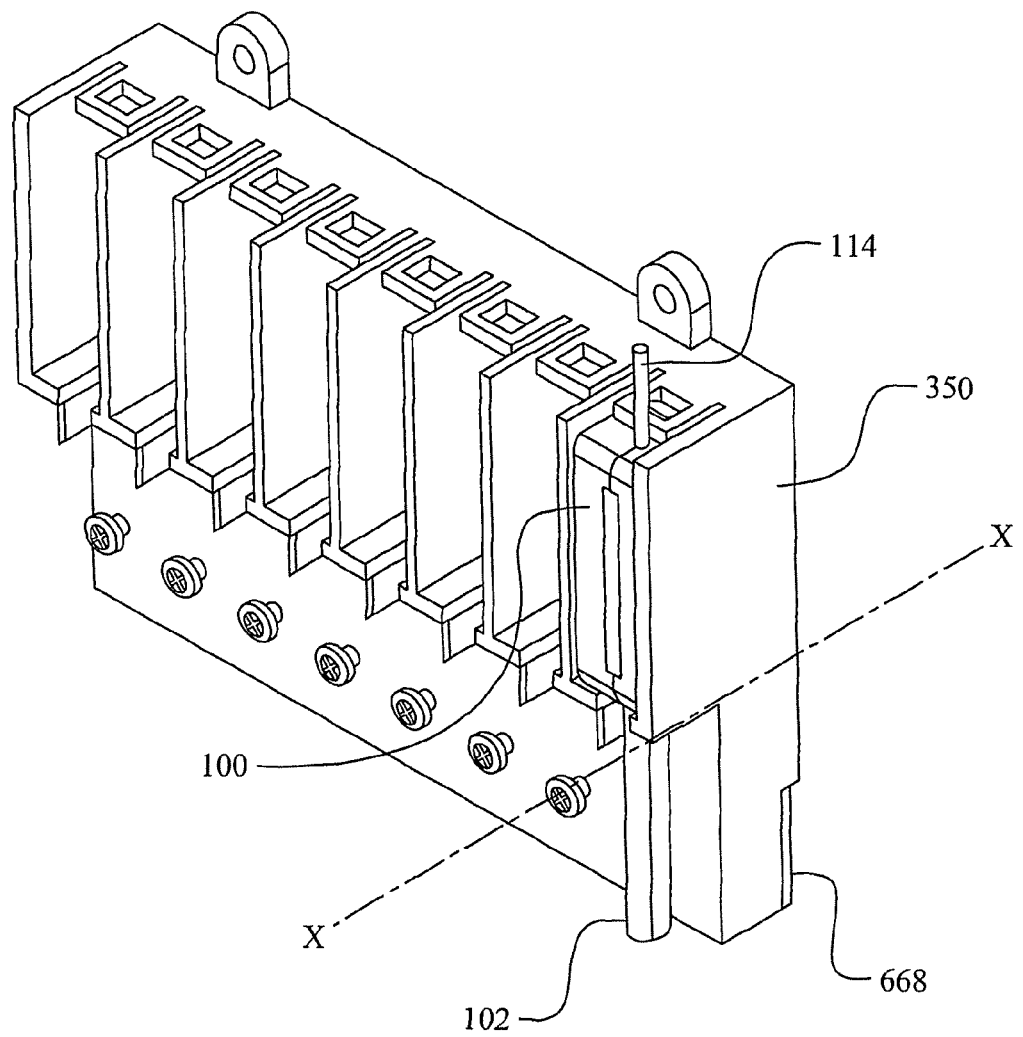
FIG. 7 is a front isometric view of a cable clamp assembly including a carrier with an installed clamp module with a fiber optic cable mounted therein.
Figure 8:
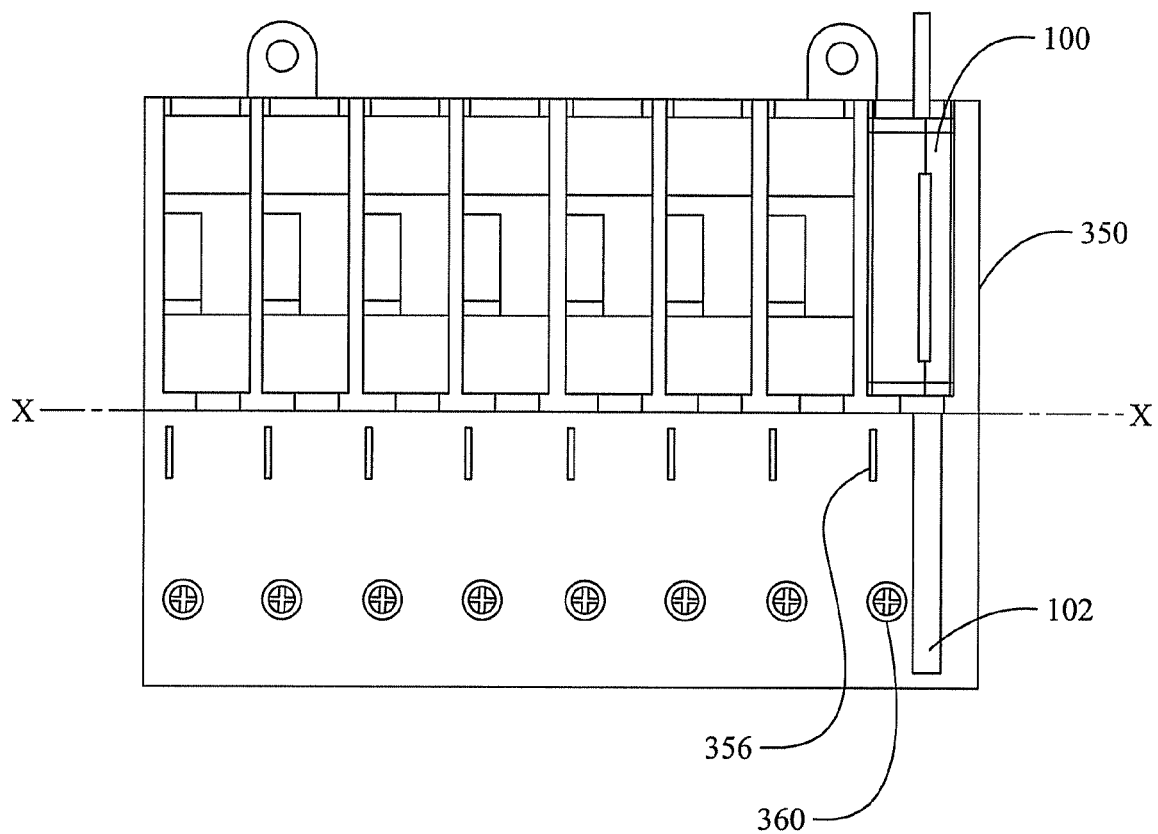
FIG. 8 is a front view of a cable clamp assembly including a carrier with an installed clamp module with a fiber optic cable mounted therein.

FIGS. 7 and 8 illustrate the carrier 350 with a clamp module 100 installed in one of the bays 352. The clamp module 100 has a fiber optic cable 102 mounted in the clamp module 100. The jacketed fiber optic cable 102 and tracer wire 116 enter the clamp module 100 and only the buffer tube 114 exits an opposite end of the module 100. The fiber optic cable 102 is held firmly by the module 100, which is held by the carrier 350. The buffer tube 114 exits the module 100 to be routed to various locations as needed.

When mounted in an enclosure, such as a telecommunications equipment enclosure, the carrier 350 can form a weather tight entrance to the equipment enclosure. The carrier is mounted in an opening of the equipment enclosure such that the portion of the carrier 350 above the line X-X in FIG. 8 is within internal position the equipment enclosure and the portion of the carrier 350 below the line X-X is positioned on an external surface of the equipment enclosure. Thus, the portion of the cable 102 outside of the equipment enclosure includes the jacket. The cable module 100 creates a weather tight seal around the cable 102, as discussed above, and the unprotected buffer tube 114 exits the module 100 inside the equipment enclosure. Additionally, this mounting configuration allows a technician to access the testing terminals 356 and the switches 360 from outside the equipment enclosure. Therefore, the technician can disconnect a single tracer wire 116 from ground, perform the needed tests, and reconnect the tracer wire 116 to ground, all from outside the equipment enclosure and without removing the cable 102, the strength members 112 or the tracer wire 116 from the module 100, without removing the module 100 from the carrier 350 and without removing the carrier 350 from the equipment enclosure.

As best shown in FIG. 8, the cable 102 enters the clamp module 100 off center. In addition to providing room for the conductive contact 118 within the clamp module 100, the offset allows the cable 102 to pass up the carrier 350 and enter the module 100 without interfering with access to the testing terminal 356 or the switch 360.

Figure 9:
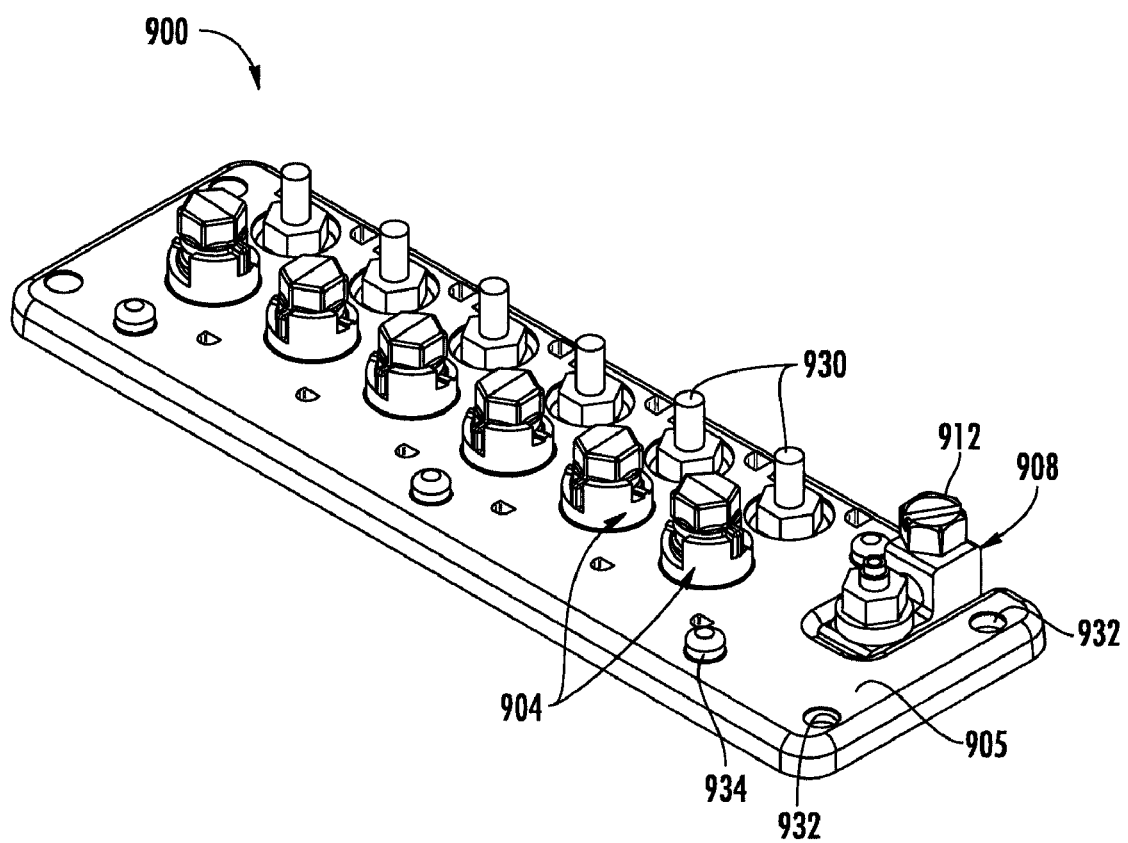
FIG. 9 is a front isometric view of another assembly for selectively connecting a wire to ground.
Figure 10:
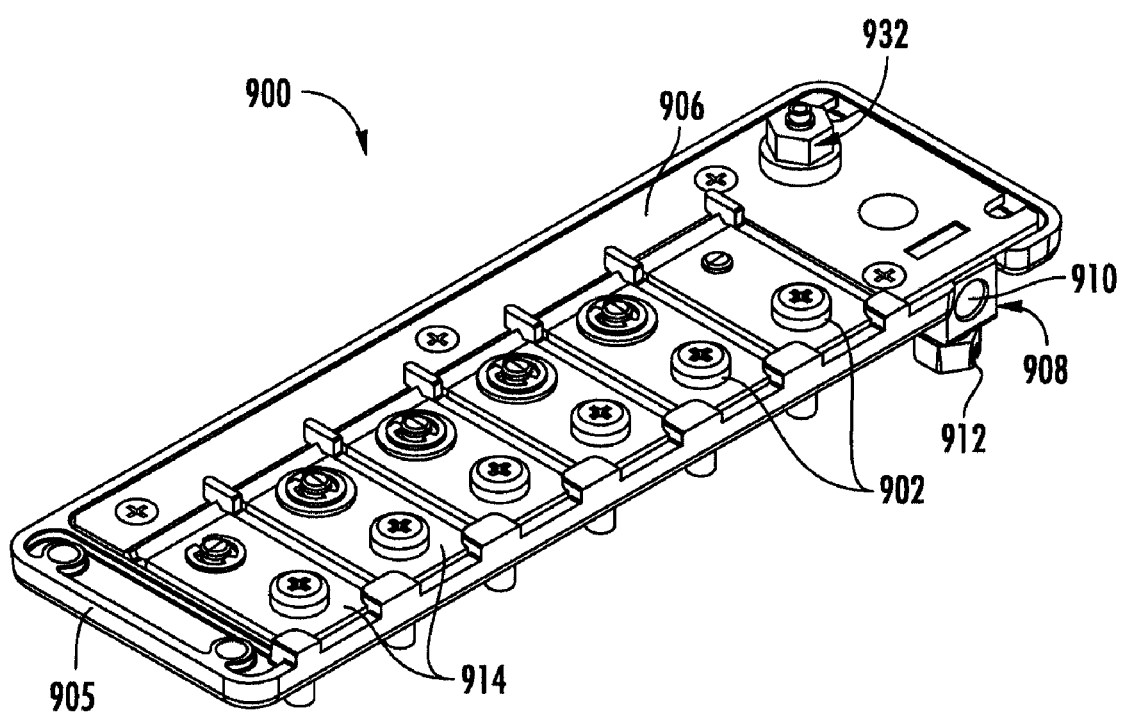
FIG. 10 is a rear isometric view of the assembly of FIG. 9.

Another embodiment of an assembly for selectively connecting one or more electrical wires to ground will now be described with reference to FIGS. 9-15. As best shown in FIGS. 9 and 10, the assembly 900 includes a plurality of conductive contacts 902, a plurality of switches 904, and a ground bar 906. Each switch 904 is associated with a different one of the conductive contacts 902 for selectively disconnecting its associated conductive contact 902, and any wires electrically connected to the conductive contact 902, from the ground bar 906.

Figure 12A:
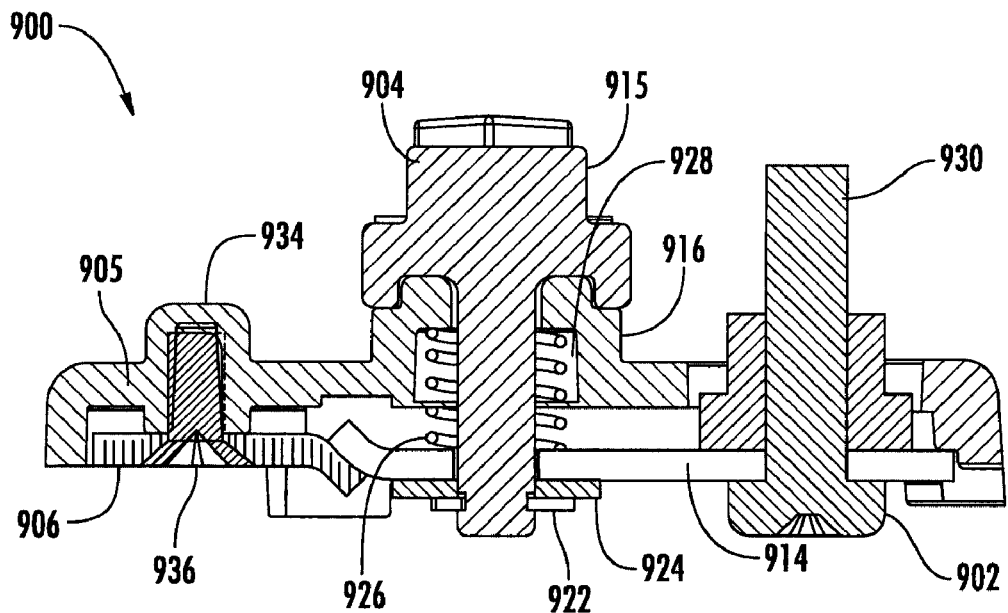
FIG. 12A is a partial sectional view of the assembly of FIG. 9 showing a ground plate in the connected position.
Figure 12B:
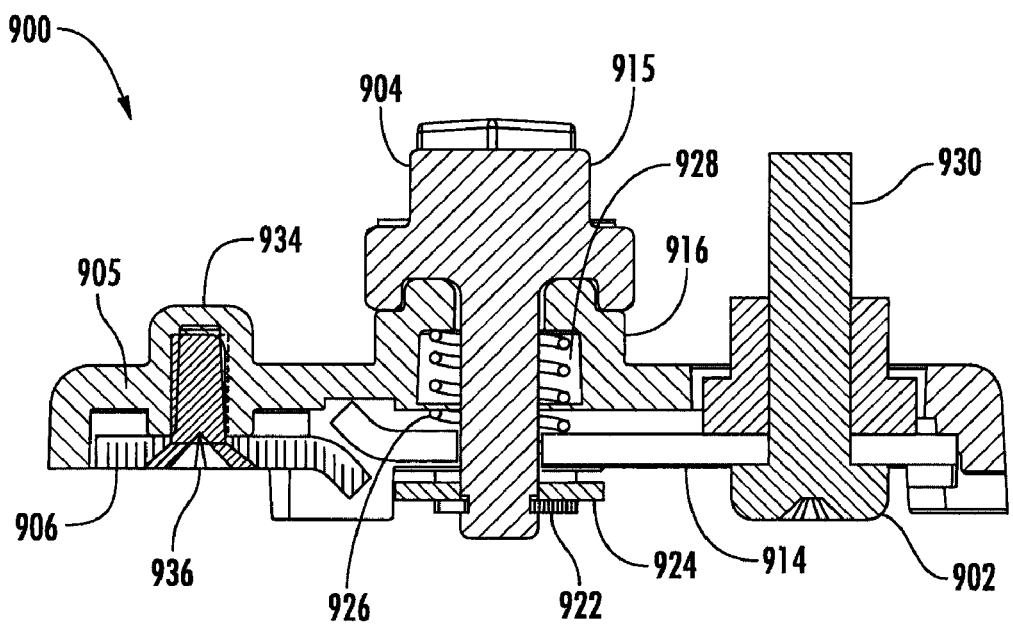
FIG. 12B is a partial sectional view of the assembly of FIG. 9 showing the ground plate in the disconnected position.
Figure 13:
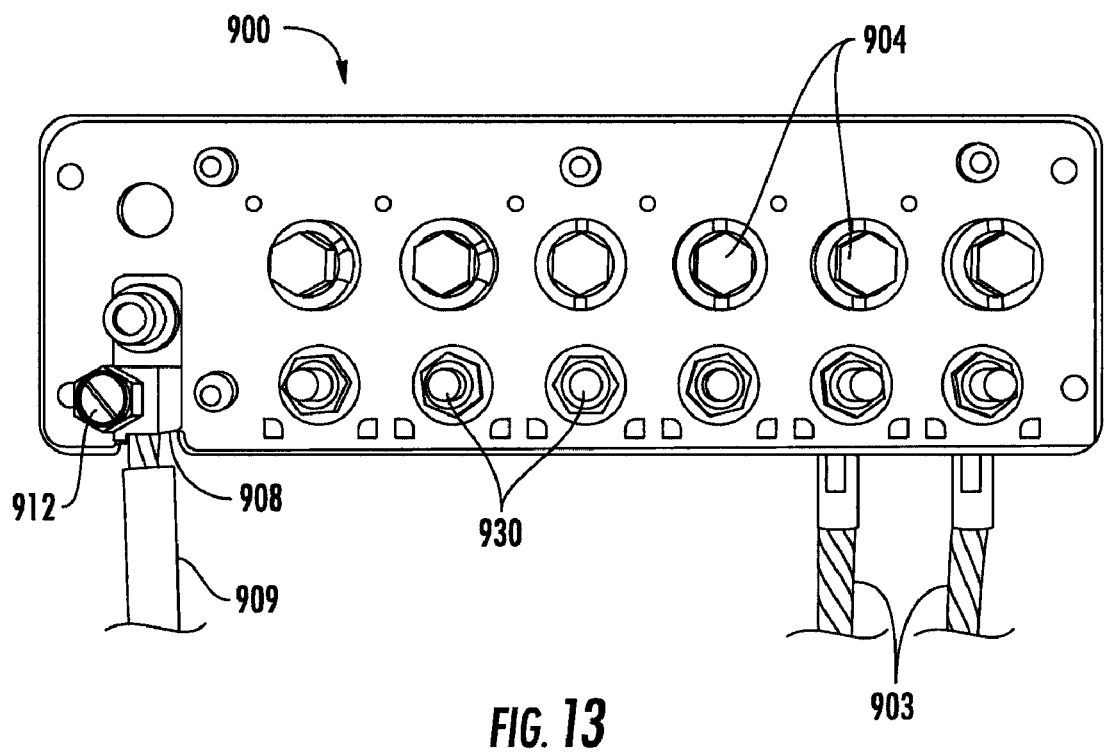
FIG. 13 is a front view of the assembly of FIG. 9 with a grounded cable connected to a ground contact and two wires connected to two conductive contacts.
Figure 14:
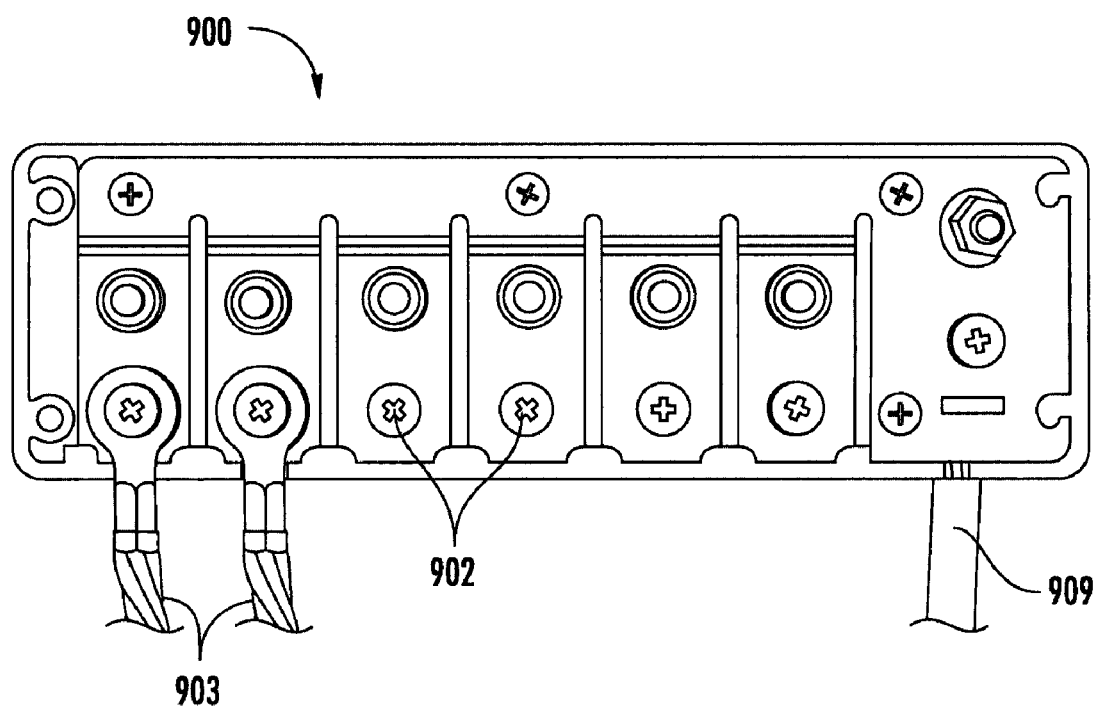
FIG. 14 is a rear view of the assembly shown in FIG. 13.

In the example embodiment shown in FIGS. 9-15, the assembly 900 includes a body 905 and a ground contact 908. The ground contact 908 is electrically coupled to the ground bar 906 and is used to electrically couple the ground bar 906 to a reference voltage (commonly referred to as "ground"), such as earth ground, a floating ground, etc. For example, a grounded wire 909 may be inserted into an opening 910 of the ground contact 908 and a fastener 912, such as a bolt, screw, etc., can be tightened to hold the grounded wire 909 coupled to the ground contact 908 as shown in FIG. 13. A conductive plate 914 is positioned between the ground bar 906 and each conductive contact 902 for electrically connecting the ground bar 906 to the conductive contact 902. When one or more wires 903 (including the shield of a shielded wire or cable) are electrically connected to one or more conductive contacts 902, as shown in FIGS. 13 and 14, the wires 903 may be selectively disconnected from ground by actuating the associated switches 904.

Figure 11:
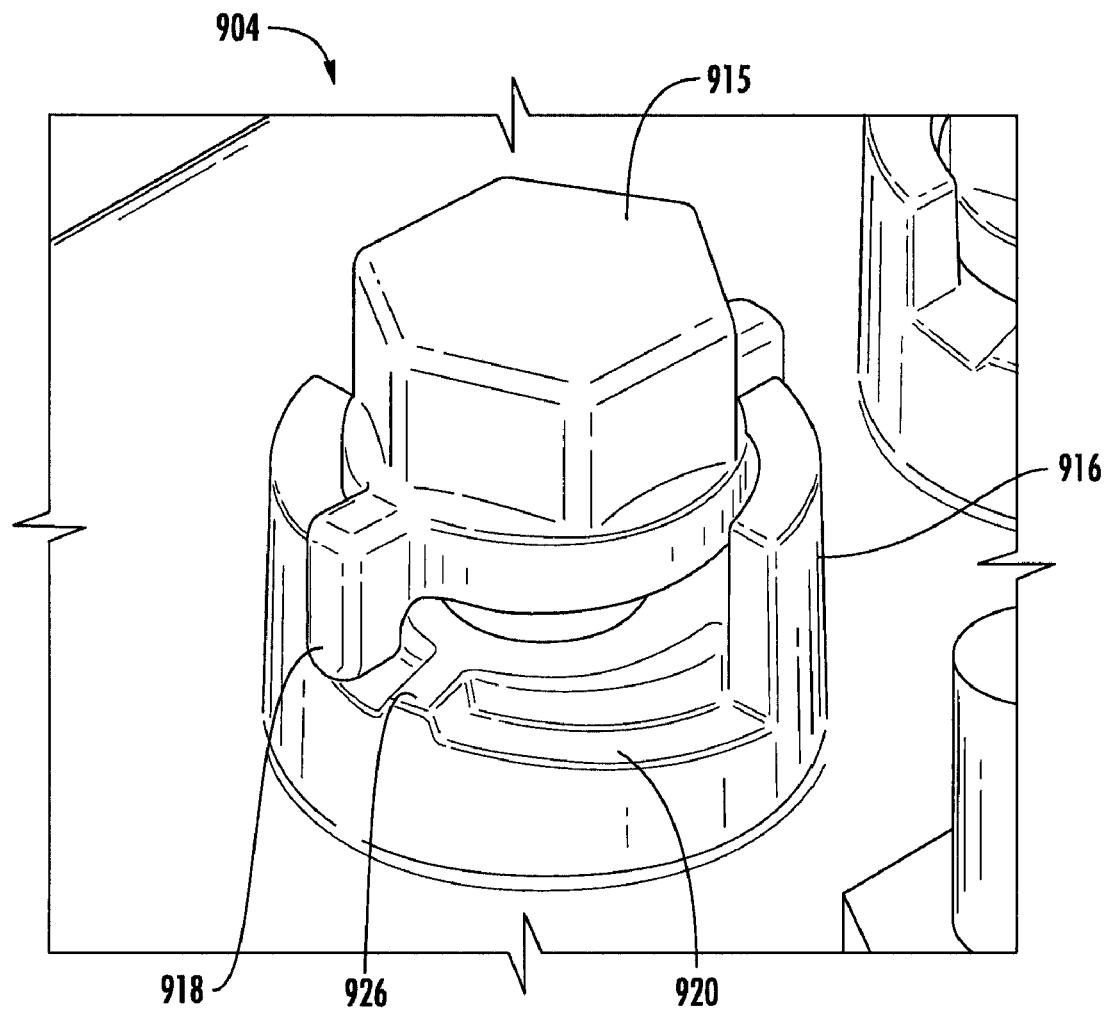
FIG. 11 is an isometric view of a switch used in the assembly of FIG. 9.

Actuating one of the switches 904 separates the associated conductive plate 914 from the ground bar 906. In this example embodiment, the switch 904 may be actuated with a tool commonly known as a "216 tool" to rotate the switch 904. As best shown in FIG. 11, the switch 904 may be a cam actuator having an actuator 915 and a silo 916. Turning the actuator 915 clockwise from a connected position (shown in FIG. 12A) causes tabs 918 to ride up inclines 920 toward a disconnected position (shown in FIG. 12B). In particular, turning the actuator 915 clockwise raises the actuator 915 relative to the silo 916. As shown in FIG. 12A, the actuator 915 includes a clip 922 and a washer 924. The clip 922, which may be a c-clip, e-clip, or any other suitable clip, is captured and held by a notch in the actuator 915. The washer 924 surrounds a portion of the actuator 915 and is held between the clip 922 and the conductive plate 914. Thus, as the actuator 915 moves upwardly relative to the silo 916, the clip 922 and the washer 924 are also raised upwardly. This motion raises conductive plate 914 upwardly and separates the conductive plate 914 from the ground bar 906, as shown in FIG. 12B.

When the conductive plate 914 is disconnected from the ground bar 906 as shown in FIG. 12B, the conductive contact 902, and any wires connected to the conductive contact 902, are likewise disconnected from the ground bar 906. A resilient member 926, such as a spring, is held around the actuator 915 within a recess 928 in the body 905. This resilient member 926 applies a downward biasing force against the conductive plate 914. The resilient member 926 resists separation of the conductive plate 914 from the ground bar 906 and aids in holding the conductive plate 914 in contact with the ground bar 906 when the actuator 915 is in the connected position shown in FIG. 12A.

Each switch 904 can include an indicator to inform a user whether the associated conductive contact 902, and any wires connected thereto, are disconnected from ground. For example, a stop 926 provides a physical indication to the user. As the user rotates the actuator 915 clockwise and the tab 918 climbs the incline 920, the tab 918 encounters the stop 926, which resists continued rotation of the actuator 915. Further turning of the actuator 915 by the user causes the tab 918 to clear the stop 926, thereby indicating that the associated conductive contact 902 is electrically disconnected from the ground bar 906. This stop 926 also reduces the likelihood of the actuator 915 being turned counterclockwise unintentionally, which will electrically reconnect the conductive contact 902 to the ground bar 906.

The tabs 918 also provide a visual indicator of whether the associated conductive contact 902 is electrically disconnected from the ground bar 906. When a conductive contact 902 is connected to the ground bar 906 as shown in FIG. 12A, the tabs 918 of the associated switch 904 will be oriented vertically (i.e., at the 6 and 12 o'clock positions). When the conductive contact 902 is electrically disconnected from the ground bar 906 as shown in FIG. 12B, the tabs 918 of the associated switch 904 will be oriented horizontally (i.e., at the 3 and 9 o'clock positions). Similar or other visual indicators of a conductive contact's position may be employed in other embodiments as desired.

In the example embodiment shown in FIGS. 9-15, each conductive contact 902 has an associated testing terminal 930. The testing terminal 930 protrudes above the body 905 on a front side of the assembly 900 as shown in FIG. 9. The testing terminal 930 is electrically connected to the wire 903 when the wire 903 is electrically connected to (e.g., terminated on) the conductive contact 902 associated with the testing terminal 930. When the actuator 915 is in the connected position, the testing terminal 930, the wire 903 and the conductive plate 914 are electrically connected to the ground bar 906 and thereby coupled to ground. When the actuator 915 is rotated to the disconnected position, the testing terminal 930, the wire 903 and the conductive plate 914 are electrically disconnected from the ground bar 906 and ground. However, the testing terminal 930, the wire 903 and the conductive plate 914 remain electrically connected to one another. This permits a user, such as a technician, to disconnect the wire 903 from ground to perform tests with the wire 903, such as toning the wire 903, by simply turning the actuator 915. At the same time, other wires 903 electrically connected to other conductive contacts 902 can remain electrically connected to the ground bar 906. Alternatively, the assembly 900 can be configured such that turning an actuator 915 results in disconnecting multiple (i.e., some or all) conductive contacts 902 from the ground bar 906.

Further, a technician can make an electrical connection to a wire 903 via an associated testing terminal 930. In this manner, the technician is able to electrically disconnect a wire 903 from the ground bar 906 and test the wire 903 via the associated testing terminal 930 without physically removing or touching the wire 903. Nor does the technician even need to access a backside of the grounding assembly 900, where the wires 903 may be directly connected to the conductive contacts 902, in order to disconnect the wires 903 from the ground bar 906.

The body 905 of the grounding assembly 900 may be a monolithically formed body such as a single molded piece. Further, the monolithic body 905 may include the silos 916 for the switches 904 molded in the body. Additionally, mounting holes 932 for receiving assembly mounting screws, and internally threaded protrusions 934 for receiving ground bar mounting screws 936 may also be integrally molded into the body 905. The body 905 is preferably made of a suitable nonconductive material.

Although the grounding assembly 900 in this example embodiment includes six conductive contacts 902 and six associated switches 904, more or less contacts 902 and switches 904 (including only one contact 902 and one switch 904) may be employed in any given implementation.

Figure 15:
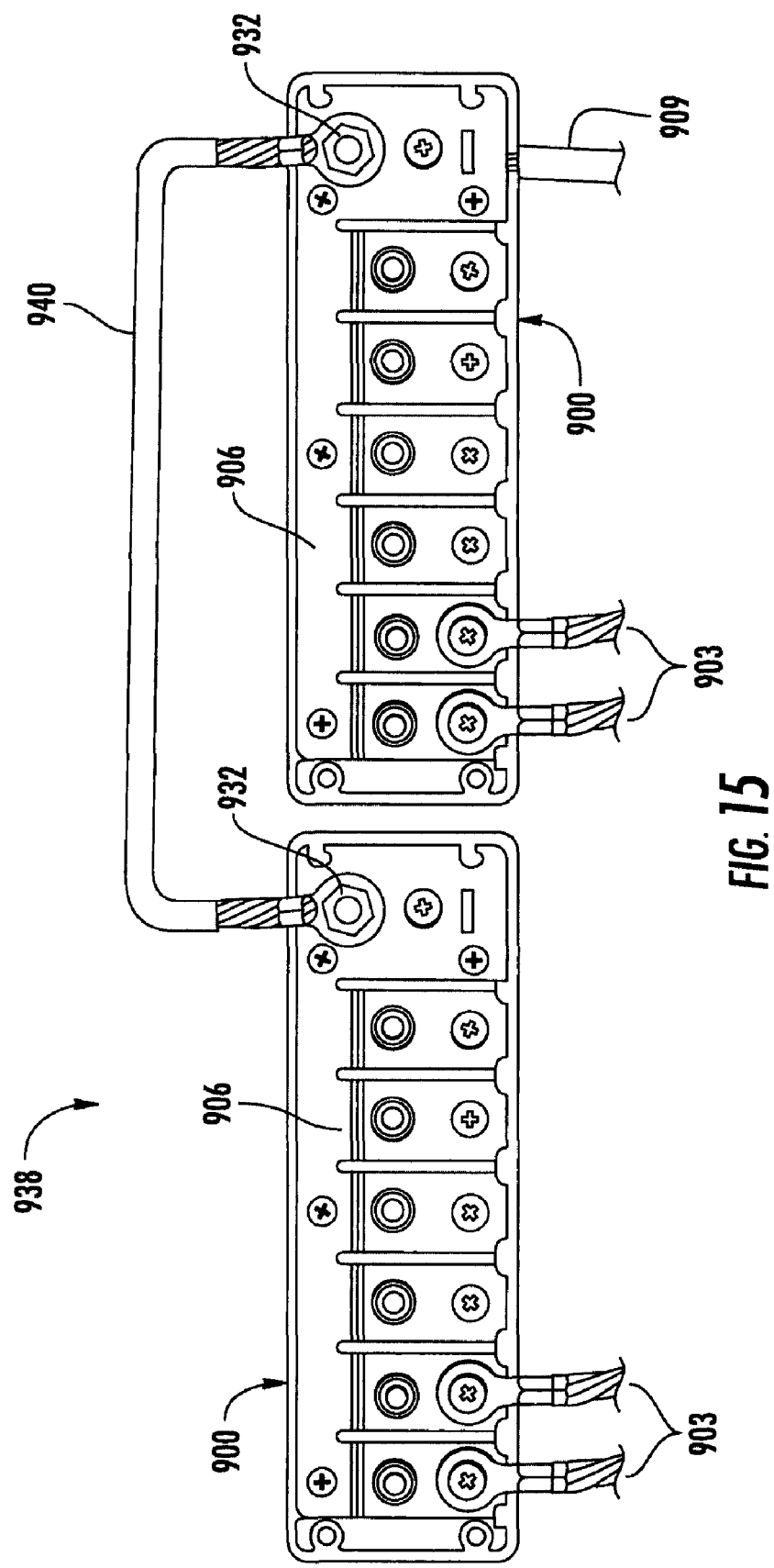
FIG. 15 is a rear view of two assemblies with commonly connected ground bars.

Additionally, multiple assemblies 900 may be coupled together, i.e., daisy chained, to create a combined grounding assembly 938 as illustrated in FIG. 15. For this purpose, each assembly 900 can include a strapping stud 932 coupled to the ground bar 906. A wire 940 can be attached between the strapping studs 932 of two or more assemblies 900 to thereby form a combined grounding assembly 938 with commonly connected ground bars 906.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed:

1. An assembly comprising:
    a ground bar for coupling to a ground;
    a conductive contact for electrically connecting a wire to the ground bar; and
    a switch moveable between a connected position and a disconnected position, the switch electrically connecting the conductive contact to the ground bar when the switch is in the connected position and electrically disconnecting the conductive contact from the ground bar when the switch is in the disconnected position to thereby selectively connect and disconnect the wire to and from the ground bar when the wire is electrically connected to the conductive contact without requiring removal of the wire from the conductive contact.

2. The assembly of claim 1 further comprising a testing terminal electrically connected to the conductive contact, wherein the switch is adapted for selectively disconnecting the conductive contact and the testing terminal from the ground bar.

3. The assembly of claim 1 wherein the assembly is a carrier for a fiber optic cable clamp assembly and the conductive contact is a carrier contact.

4. The assembly of claim 1 wherein the switch comprises a cam actuator.

5. The assembly of claim 1 further comprising a conductive plate selectively connected between the ground bar and the conductive contact.

6. The assembly of claim 5 wherein the switch is operable to selectively disconnect the conductive plate from the ground bar.

7. The assembly of claim 1 wherein the ground bar includes a contact for terminating a ground wire.

8. The assembly of claim 1 further comprising an indicator for indicating to a user whether the conductive contact is selectively disconnected from the ground bar.

9. The assembly of claim 8 wherein the indicator is a visual indicator.

10. The assembly of claim 1 further comprising a stud coupled to the ground bar for electrically coupling the ground bar to another assembly.

11. A method of using an assembly having a ground bar, a conductive contact, and a switch, the method comprising:
    electrically connecting a wire to the conductive contact; and
    actuating the switch between a connected position and a disconnected position, the switch electrically connecting the conductive contact to the ground bar when the switch is in the connected position and electrically disconnecting the conductive contact from the ground bar when the switch is in the disconnected position to thereby selectively connect and disconnect the wire from the ground bar without electrically disconnecting the wire from the conductive contact.

12. The method of claim 11 wherein the assembly includes a testing terminal electrically connected to the conductive contact, the method further comprising connecting test equipment to the testing terminal.

13. The method of claim 12 further comprising the steps of:
    disconnecting the test equipment from the testing terminal; and
    actuating the switch to selectively connect the conductive contact and the testing terminal to the ground bar.

14. The method of claim 12 wherein the test equipment includes a probe, the testing terminal comprises a slot, and connecting the test equipment to the testing terminal includes inserting the probe into the slot.

15. The method of claim 11 wherein the wire is a toner wire of a fiber optic cable.

16. The method of claim 11 wherein the wire includes a shield, and wherein electrically connecting the wire includes electrically connecting the shield to the conductive contact.

17. An assembly comprising:
    a ground bar for coupling to a ground;
    a plurality of conductive contacts for electrically connecting a plurality of wires to the ground bar; and
    a plurality of switches each associated with a different one of the conductive contacts and movable between a connected position and a disconnected position, each switch electrically connecting its associated conductive contact to the ground bar when the switch is in the connected position and electrically disconnecting its associated conductive contact from the ground bar when the switch is in the disconnected position to thereby selectively connect and disconnect one or more of the plurality of wires to and from the ground bar when said one or more of the plurality of wires is electrically connected to one or more of the conductive contacts without requiring removal of said one or more of the plurality of wires from said one or more of the conductive contacts.

18. The assembly of claim 17 further comprising a plurality of testing terminals electrically connected to the plurality of conductive contacts, wherein each switch is adapted for selectively disconnecting its associated conductive contact and testing terminal from the ground bar.

19. The assembly of claim 18 wherein each testing terminal comprises a slot for receiving a test equipment probe.

20. An assembly comprising:
    a ground bar for coupling to a ground;
    a conductive contact for electrically connecting a wire to the ground bar; and
    a switch for selectively disconnecting the conductive contact from the ground bar to thereby selectively disconnect the wire from the ground bar when the wire is electrically connected to the conductive contact;
    wherein the assembly is a carrier for a fiber optic cable clamp assembly and the conductive contact is a carrier contact.

21. An assembly comprising:
    a ground bar for coupling to a ground;
    a conductive contact for electrically connecting a wire to the ground bar;
    a switch for selectively disconnecting the conductive contact from the ground bar to thereby selectively disconnect the wire from the ground bar when the wire is electrically connected to the conductive contact; and
    a conductive plate selectively connected between the ground bar and the conductive contact.

22. The assembly of claim 21 wherein the switch is operable to selectively disconnect the conductive plate from the ground bar.

\* \* \* \* \*